United States Patent Office 3,606,746
Patented Sept. 21, 1971

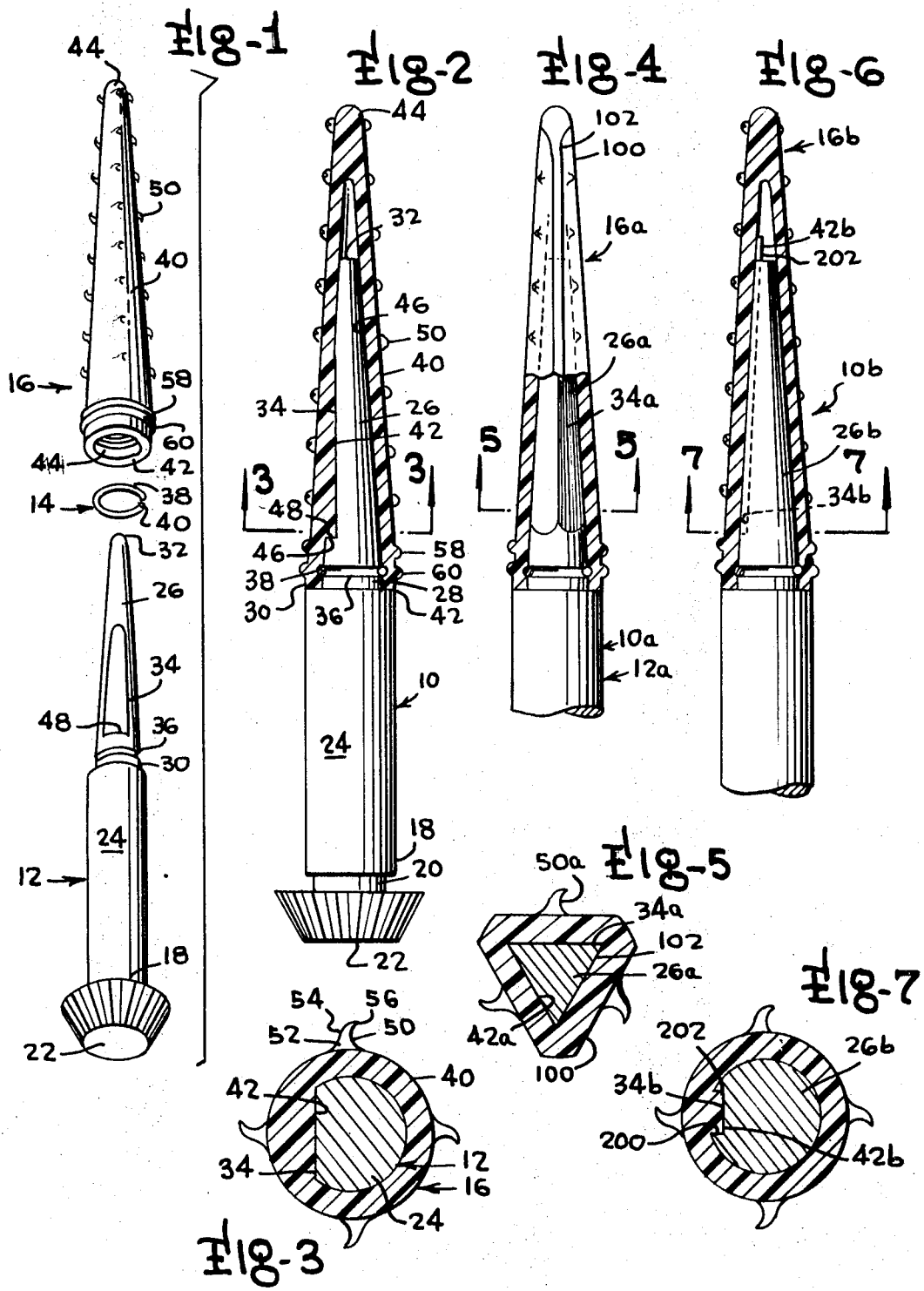

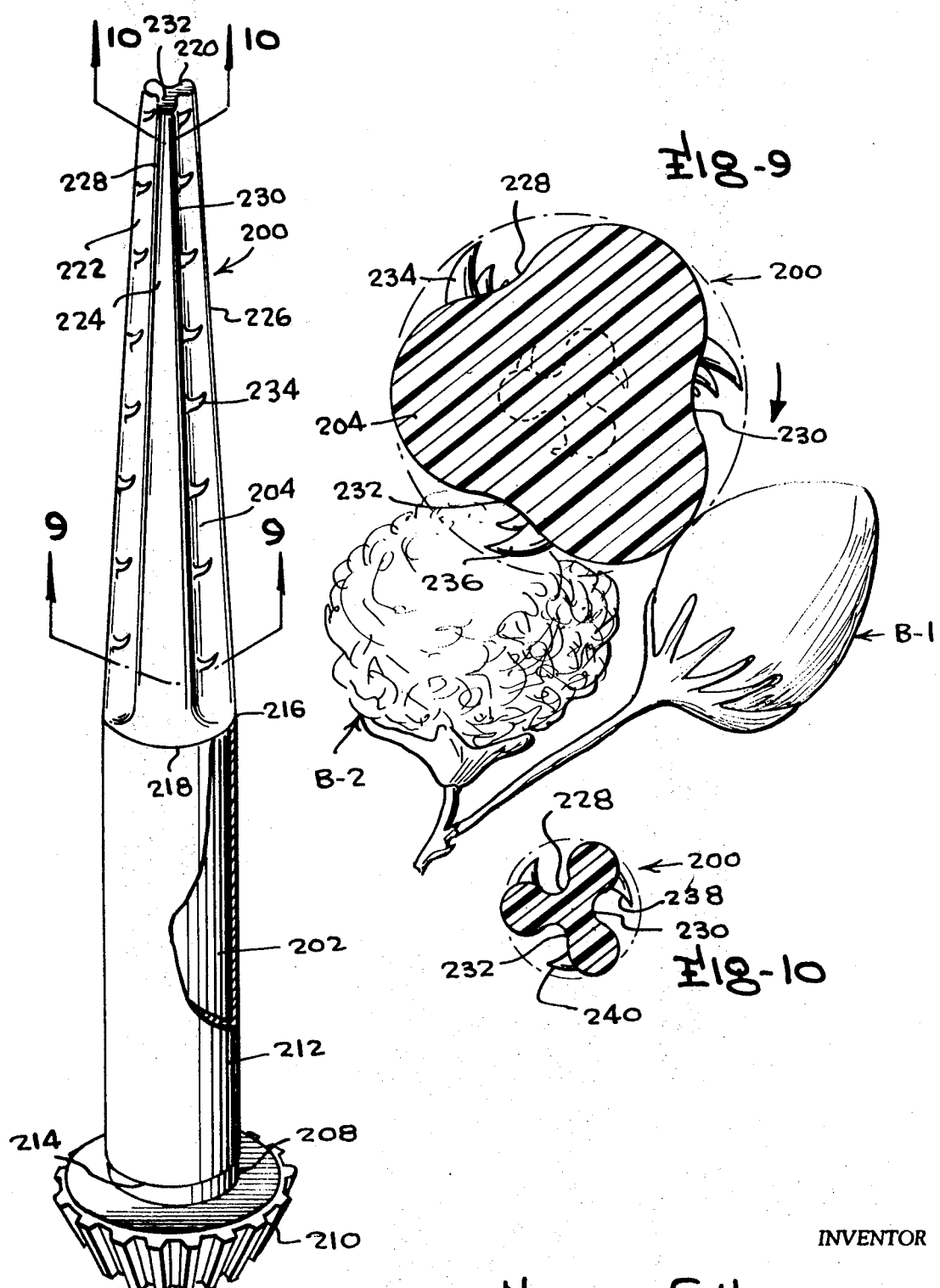

3,606,746
COTTON PICKING SPINDLES
Norman G. Hayward, Rte. 2, Box 119G,
Manassas, Va. 22110
Filed Dec. 16, 1969, Ser. No. 885,506
Int. Cl. A01d 45/18
U.S. Cl. 56—50                                    5 Claims

ABSTRACT OF THE DISCLOSURE

A spindle for cotton picking apparatus has at least its materials contact portion formed of hard plastic, the plastic portion having rows of hook-like teeth to engage the plant fibers.

A spindle for cotton picking machinery, the spindle comprising a metallic base with an outward portion, and a plastic sleeve for said outward portion, the sleeve having means for releasable engagement with the portion and having teeth therein.

CROSS REFERENCE TO RELATED APPLICATION

This application in part discloses and claims submitted matter common to my prior application, Ser. No. 671,781, filed Sept. 29, 1967, and now Pat. 3,503,191.

BACKGROUND OF THE INVENTION

(1) Field of the invention

Cotton picking machinery in widespread use comprises a gearing system with one or more spindle elements operatively engaged therewith for rotation by the gearing system. The spindles have projecting teeth which, on rotation against the cotton plant, interengage with the plant fibers and pick the cotton.

(2) Description of the prior art

Generally, the aforesaid spindles are of one piece, integral construction. Difficulties and expense incurred where the spindles are so constructed, occasioned by wear and relative short life of the teeth, have prompted prior attempts to provide removable or replaceable spindle portions at the areas of maximum wear. Exemplary of prior patents on this subject are the following U.S. patents: 423,885, Todd, Mar. 18, 1890; 2,440,767, Baker, May 4, 1948; 2,787,110, Call, Apr. 2, 1957; 2,929,189, Oshatz, Mar. 22, 1960; 2,975,580, Haring, Mar. 21, 1961.

SUMMARY OF THE INVENTION

A principal objective of this invention resides in the provision of new and novel spindles for cotton picking apparatus wherein the material contact portion of the spindle is non-metallic and wherein a special tooth configuration replaces prior, unsuccessful tooth forms. Such tooth form is of particular advantage in the case of non-metallic spindles.

The present invention provides a new and novel spindle assembly wherein that portion of the assembly which is subjected to maximum wear is adapted for non-complex replacement. A basic objective of the invention, therefore, is to provide a spindle assembly of the character indicated above wherein the working portion is replaceable, and wherein such replacement does not involve disassembly or access to the drive components of the machine.

A related objective resides in the provision of a replaceable spindle portion engaged with the main spindle by frictional engagement and by contact of non-circular portions of each, thereby preventing relative rotation of the elements. The spindle element hereof includes a metallic portion for contact with the prime mover guide mechanism, and non-metallic portion, molded of plastic, or the like, as a replaceable work contact element.

In a further embodiment of the invention, the spindle is cast or molded of plastic throughout, and has a metallic sleeve which is provided during the molding procedure. The sleeve serves to maintain dimensional tolerance at the critical bearing area of the spindle and to compensate for shrinkage of the material in molding.

Still another important object resides in the construction of a spindle work portion of plastic or like material, and the incorporation of specially shaped, flexible barbs or teeth which engage the cotton by hooking action to avoid gathering of anything other than the cotton from a ripe boll. Further, the hooking action of the barbs eliminates the need which heretofore existed to apply water to the spindles during operation, thereby speeding and improving the harvesting procedure. In addition, the hooking action does not require extreme sharpness in order to be effective, and therefore, the uasble life of the replaceable portion of the spindle is appreciably lengthened.

The present invention has as a further objective thereof the provision of means to reduce the possibility of moisture on the spindle from finding its way into the machine, and coactive means precluding the transfer of machinery lubricant to the spindle whereat it would soil or damage the cotton.

The invention comprehends the inclusion of novel snap ring attachment means which engage the replaceable spindle portion.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a disassembled perspective view of a spindle assembly constructed in accordance with the teachings of this invention;

FIG. 2 is an elevational view, partially in cross section, of the elements of FIG. 1 in an assembled condition;

FIG. 3 is an enlarged, detail view substantially on the section line 3—3 of FIG. 2, looking in the direction of the arrows;

FIG. 4 is a view similar to FIG. 2, showing a modification;

FIG. 5 is a sectional view showing details taken substantially on the line 5—5 of FIG. 4, looking in the direction of the arrows;

FIG. 6 is another view similar to FIG. 2, showing another modified form of the invention;

FIG. 7 is a detail, sectional view taken on line 7—7 of FIG. 6, looking in the direction of the arrows;

FIG. 8 is a perspective view of a further embodiment of the invention;

FIG. 9 is an enlarged transverse cross sectional view on line 9—9 of FIG. 8, looking in the direction of the arrows; and FIG. 10 is an enlarged sectional view showing details, taken on line 10—10 of FIG. 8.

DESCRIPTION OF THE PREFERRED EMBODIMENTS

Referring initially to FIGS. 1 through 3 of the drawing, a first form of the invention is there shown and is generally designated by reference numeral 10. Basically, three components are included in the assembly 10: a main spindle 12, a retaining ring 14, and a replaceable sleeve 16.

The spindle 12 is of metallic construction and may be manufactured in the particular form dictated by the present invention initially, or may be remanufactured from existing spindles. The main spindle includes an inboard end portion 18 having a reduced neck 20 which carries a bevel gear 22. The gear 22 is normally in operative engagement with a gear system (not shown) of cotton picking machinery, which is effective to rotate the main spindle. Outboard of the gear 22, the spindle has a substantially cylindrical central section 24, which is integral with a tapered outboard section 26. The section 26 has an enlarged base end 28 contacting the section 24 at a shoulder 30, and a truncated outer end 32 of reduced diameter. A longitudinal flat face 34 is formed on the section 26 and is substantially parallel to the longitudinal axis of the main spindle. The section 26 further has an annular groove 36 formed therein adjacent its base 28, for a purpose described below.

The retaining ring 14 is preferably of metallic construction and comprises an annular body portion 38 split at 40 whereby it possesses a degree of limited flexibility. The ring is adapted to seat in the groove 36 of the spindle section 26 and is dimensioned to fit closely therein.

The replaceable sleeve 16 is preferably formed of a hard plastic substance such as structural nylon, or the like, and is of elongated, substantially hollow form. The sleeve has a body portion 40 with an inner end 42 and an outer end 44, and has a bore 46 formed therein and opening on the end 42. The bore 46 is shaped and dimensioned such that the sleeve fits closely over the portion 26 of the spindle. As shown in FIGS. 2 and 3, the inside wall of the sleeve defining the bore has a flat section 42 which bears against the face 34 of the spindle. By virtue of the contact of the flat face and section, interrupting the generally circular form of the bore and spindle section, relative rotation between these elements is prevented.

The sleeve has an internal groove 44 formed therein adjacent its end 42 which is coaligned with the groove 36 and snap ring 14 upon correct assembly of the elements. The ring seats in the groove 44, and the groove 26, to thereby provide a releasable connection means for the sleeve. It will be observed that the sleeve and spindle have shoulders, at 46, 48, which meet at a location setting the correct inward dwell of the sleeve on the spindle to position the ring within said groove.

The sleeve has a plurality of teeth 50 thereon arranged in longitudinally extending rows. The teeth are specially formed to result in a hooking action to withdraw the cotton from the boll, and are somewhat flexible due to the construction of the sleeve from plastic. Each tooth or barb comprises an enlarged base 52 integral with the sleeve which tapers to a cupped body portion 54 terminating in a hook portion 56 bent forwardly in the direction of rotation of the spindle.

The sleeve 16 has two, annular outwardly extending protector rings 58, 60 thereon adjacent its inner end 42. The invention thereby provides a means for blocking the passage of water from the sleeve to the machine, and prevention of drainage of lubricant from the machine drive from finding its way to the working portion of the spindle and thereby soiling or otherwise contaminating the fibers.

FIGS. 4 and 5 disclose a first modified form of the invention, designated 10a. Here, the outboard portion 26a of the main spindle 12a has three flat faces 34a mating with a like number of flat sections 42a of the sleeve 16a. The sleeve has flat outer faces 100 arranged substantially parallel to its flat inner faces 42a with rounded edge portions 102 intermediate the outer faces. The teeth 50 are provided on the flat outer faces.

A further modification is seen in FIGS. 6 and 7. Here, the assembly 10b includes a spindle outboard section 26b with a longitudinal slot 200 therein, providing a flat face 34b in recessed form. The sleeve 16b has an inward, longitudinal projection 202, with a flat outer section 42b, and the projection is positioned within the slot 200 in the manner shown.

The operation of this invention insofar as contact with the material to be harvested is concerned is the same as with a conventional spindle assembly. However, the above described hooking action of the barbs 50, 50a, 50b, with respect to the fibers is effective in selectively withdrawing cotton from the boll, leaving behind undesired foreign material. Spindle life is measurably increased by virtue of the resiliency of the barbs, and by the particular action employed in the operation thereof.

Should a spindle require replacement however, it is merely necessary to force the sleeve 16, 16a or 16b off the main spindle associated therewith, and to thereafter replace it with another spindle.

In a second major embodiment of the invention, shown in FIGS. 8 through 10, the important feature of formation of the spindle contact areas from hard plastic, such as for example, a filled polycarbonate and the provision of specially oriented, hook form picking teeth, are retained. In this form of the invention, generally identified in the drawing by reference numeral 200, a unitary structure is however provided.

The spindle assembly 200 comprises a substantially cylindrical main spindle portion 202, and an outer contact portion 204 which is integral with the main portion. The portion 202 has an inboard neck portion 208 which carries a bevel gear 210. The gear and the neck portion are also integral with the spindle 202 and the contact portion 204, and are of dimensions consistent with the requirements of existing machinery.

Disposed about the cylindrical main spindle portion 202 is a tubular metallic sleeve 212. The sleeve has a first end 214 which seats against the neck 208, and a second end 216. The provision of a metallic sleeve at this bearing surface area of the assembly permits non-complex molding of the major spindle components from hard plastic, but retains stability of the bearing surface. It, moreover, compensates for any shrinkage which occurs in molding, and holds a precise tolerance as to the diameter of the bearing surface.

The contact portion 204 has a rim 218 which abuts directly against the end 216 of the sleeve. The portion 204 is elongated and extends from the rim 218 to an outer or distal end 220. In sectional form, the portion 204 is of clover-like construction, having a series of three extended leaf sections 222, 224 and 226, which are of gradually diminished size from the rim 218 to the end 220. Between the leaf sections, the portion 204 has valleys or indented portions 228, 230 and 232.

Formed on the section 204 in each of the indented portions is a row of teeth 234. Each of the teeth 234 is so mounted as to lie within a curvilinear line comprising a radius of the circle extending about the center of the portion 204 and the maximum outward projections of the leaf sections. Thus, when the spindle rotates, the teeth contact the material to be harvested only after the material is struck by the leaf sections. The teeth are otherwise similar to the teeth 50 of the first form of the invention, each including an enlarged base 236 tapering to a cupped body portion 238 and terminating in a hook 240 bent forwardly in the direction of rotation.

As will be observed in FIG. 9, this construction results in the harvesting of ripe fibers only. In the drawing, an immature boll B–1 is uneffected by the apparatus, but the ripe cotton of the bolls B–2 is engaged by the teeth 234 and harvested.

I claim:

1. A spindle for a cotton picking machine the spindle comprising:
   a main spindle portion having an inboard end portion with drive means thereon;
   an elongated outer contact portion formed integrally with the main spindle portion and having an inboard rim;
   the main spindle portion and the outer contact portion being formed of a non-metallic substance;

metallic sleeve means engaged about the main spindle portion providing a bearing surface for the spindle;

the outer contact portion being tapered and of diminished size from its inboard rim to an outer end thereof;

the outer contact portion having a plurality of outwardly extended leaf sections with valleys arranged alternatively therewith;

a plurality of teeth arranged in longitudinally extending rows on each of said leaf sections and within each of said valleys; and the teeth being disposed between the leaf sections below the arcs of rotation thereof.

2. The invention of claim 1, wherein:

the teeth each comprise a base, a cupped body portion, and a forward hook portion.

3. The invention of claim 1, wherein:

three equidistantly spaced leaf sections are supplied.

4. The invention of claim 1, wherein:

the drive means comprises a gear.

5. The invention of claim 1, wherein:

said non-metallic substance comprises a filled polycarbonate.

References Cited

UNITED STATES PATENTS

| | | | |
|---|---|---|---|
| 464,852 | 12/1891 | Canuteson | 56—50 |
| 2,787,109 | 4/1957 | Lindsay | 56—50 |
| 2,929,189 | 3/1960 | Oshatz et al. | 56—50 |
| 3,525,202 | 8/1970 | Madden | 56—50 |

RUSSELL R. KINSEY, Primary Examiner